United States Patent [19]

Ide

[11] Patent Number: 4,515,486
[45] Date of Patent: May 7, 1985

[54] ELASTOMERIC SUPPORTED HYDRODYNAMIC BEARING

[76] Inventor: Russell D. Ide, 28 Daniel Dr., Coventry, R.I. 02816

[21] Appl. No.: 576,570

[22] Filed: Feb. 3, 1984

[51] Int. Cl.³ .............................................. F16C 32/06
[52] U.S. Cl. .................................. 384/117; 384/119; 384/122; 384/124; 384/306; 384/308
[58] Field of Search ............... 384/117, 119, 122, 124, 384/224, 306, 308

[56] References Cited

U.S. PATENT DOCUMENTS

| | | | |
|---|---|---|---|
| 3,062,598 | 11/1962 | Summers | 384/224 |
| 3,424,505 | 1/1969 | Pizzitola | 384/119 |
| 3,829,180 | 8/1974 | Gardner | 384/306 |

Primary Examiner—Lenard A. Footland
Attorney, Agent, or Firm—Barlow & Barlow, Ltd.

[57] ABSTRACT

A fluid bearing is disclosed which consists essentially of a number of bearing pads, each having a face member and a support member that are separated and bonded together by an elastomeric material. The face member will have a load engaging surface, and its back surface will have at least one arcuate portion to provide a point of inflection which opposes an identical arcuate surface providing another point of inflection located on the support member. In operation the pad which operates in a fluid that serves as a lubricant will develop friction and pressure forces, which move the pad in such a way as to provide a wedge for hydrodynamic lubrication.

6 Claims, 8 Drawing Figures

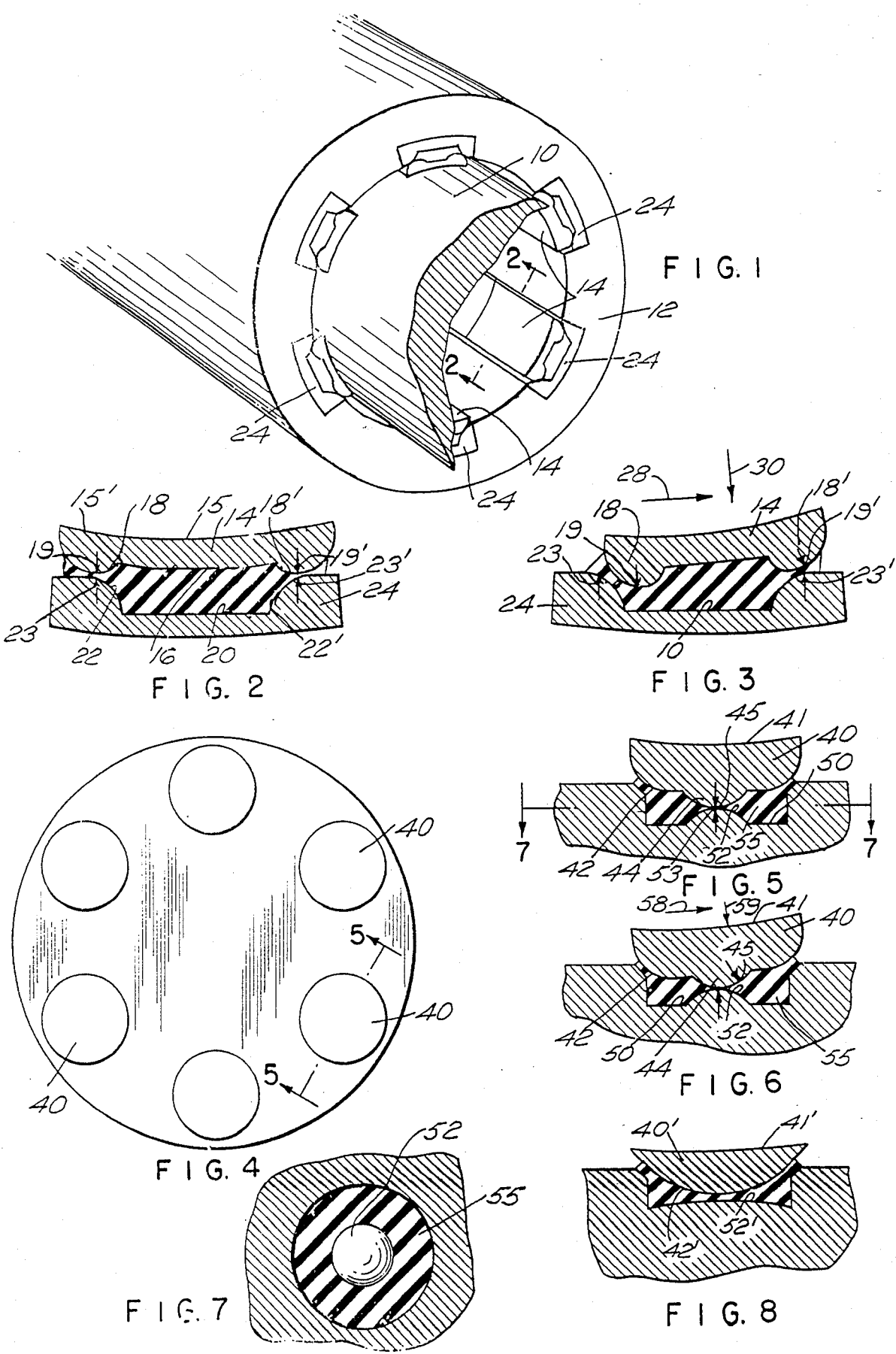

ELASTOMERIC SUPPORTED HYDRODYNAMIC BEARING

BACKGROUND OF THE INVENTION

Hydrodynamic bearings of the form that are also known as swing pad bearings are mounted in such a way that they can move to permit the formation of a wedge-shaped film of lubricant between the relatively moving parts. Essentially the pad displaces through a swing-type motion about a center located in front of the pad's surface, and bearing friction tends to open the wedge. Examples of this type of bearing are seen in the Hall patent, U.S. Pat. No. 2,137,487. One of the difficulties in utilizing a swing pad as seen in the aforesaid patent revolves around the problem of lubrication between the support and the swing pad itself, and the difficulty of the pad in adjusting to varying loads due to stick slip. A further difficulty is that the viscous friction force is too small to cause sufficient movement of the pad for development of a wedge-shaped film for high load capability.

SUMMARY OF THE INVENTION

The present invention relates to a bearing in which the pad is spaced from the support member by an elastomeric material. The support member is characterized by a concavity with an arcuate surface with points of inflection, the pad or face member having an arcuate surface with points of inflection such that at rest the points of inflection are aligned and opposed to each other. As friction forces are applied, the points of inflection become misaligned, allowing the pressure loading to pivot the surface pad to form a wedge shape. In the swing pad type bearing the pressure force opposes wedge formation; in the present invention the pressure force produces the wedge angle. Controlling the arcuate surface geometry determines the wedge angle, which should develop ratios of inlet to exit heights of two to six. The nature of the design allows for bidirectional operation.

One of the primary objects of the present invention is to provide a bearing which will eliminate the need for any lubrication between the pad or face member and the support member, and which will develop relatively large wedge angles for maximum load capability. A further object of the invention is to provide a bearing which will have bi-directional operational capability that can be designed either as a flat thrust bearing, or a cylindrical journal type bearing. Load carrying capability in low viscosity fluids such as water exceeds 1000 psi.

BRIEF DESCRIPTION OF THE DRAWINGS

In the drawings,

FIG. 1 is a perspective view of a journal type arrangement;

FIG. 2 is a sectional view taken on lines 2—2 of FIG. 1;

FIG. 3 is a view similar to FIG. 2 with the pad shown in the operating position;

FIG. 4 is a plan view of a thrust form utilizing the bearing of the instant invention;

FIG. 5 is a view taken on lines 5—5 of FIG. 4;

FIG. 6 is a view showing the bearing in its operating position;

FIG. 7 is a view taken on lines 7—7 of FIG. 5; and

FIG. 8 is a view of a modified form of bearing pad.

DETAILED DESCRIPTION OF THE PREFERRED EMBODIMENTS

Referring now to FIG. 1, 10 designates a journal which has a casing 12 in which are mounted a plurality of bearing pads 14. Essentially tha pads may be circular in form or elongated so long as the orientation is proper with relationship to the axis of the journal. As seen in FIG. 2, the pad 14 has a face portion 15 and a back surface 16, the back surface 16 being defined by a pair of protuberances 18, 18' with points of inflection 19, 19'. The support portion in the casing is defined by a concavity 20, and rising from the concavity are a pair of surfaces 22, 22' with points of inflection 23, 23' that are aligned and opposed to the 18 and 18' points of inflection. The pad is spaced from the support portion by elastomeric material 24. Preferably the elastomer material 24 is bonded to the support member 20 and to the pad 14. When operating, the elastomeric material will give under the load and frictional forces to displace tha pad to the position such as seen in FIG. 3. As seen in FIG. 3, when the journal is in motion, there is a viscous friction force caused by the lubricant in the direction of the arrow 28, which moves the pad laterally such that the points of inflection are misaligned. At the same time, the pressure force of the shaft acting in the direction of the arrow 30 causes the pad to tilt to form the wedge for hydrodynamic lubrication.

It should be noted that the movement is minute and has been greatly exaggerated in the drawing purely for explanatory purposes. It should also be noted that there is always fluid in contact with the face of the bearing pad, that is between the pad and the opposing moving part.

In some cases a bearing pad made in accordance with this invention will work in a configuration of a thrust bearing, such as is shown in plan in FIG. 4. In this case the configuration of the bearing pad is altered and here the bearing pad 40 has a face surface 41, and a rear surface 42 with a protuberance 44 and point of inflection 45 located substantially centrally of the back surface of the pad. The support member is formed with a concavity 50 and a surface 52 with its point of inflection 53 arising substantially centrally therefrom. The pad is bonded with an elastomeric material 55 to the concavity, and as seen in FIG. 5, it is at the at-rest position. When the lubricant friction force, acting in the direction of arrow 58 is developed the points of inflection become misaligned, allowing the pressure force which acts in the direction of arrow 59 to cause the pad to tilt to the position shown in FIG. 6, which is substantially similar to that described in connection with the previous embodiment.

Now referring to FIG. 8 of the drawings, a slight modification of the general concept seen in FIGS. 5, 6 and 7 is presented wherein the entire back surface 42' of the pad 40' is made arcuate, as is the surface 52' of the concavity. In all other respects, the embodiment of FIG. 8 is identical and the discussion in connection with FIGS. 5 through 7 applies here also.

I claim:

1. A fluid bearing for supporting an opposing moving part, a plurality of bearing pads, each pad having a face member and a support member separated by and bonded to an elastomeric material, said face member having a load engaging surface and a back surface with at least one arcuate point of inflection, which at rest opposed an arcuate point of inflection located on said support member, and which under fluid lubricant friction and pressure forces, move to form a wedge for hydrodynamic lubrication; said friction causing lateral pad motion and misalignment of the opposing points of inflection, said pressure force causing tilting of the pad to develop a lubricant wedge.

2. A fluid bearing as in claim 1 which is bi-directional.

3. A fluid bearing as in claim 1 which develops optimum wedge angles to carry exceptionally high loads.

4. A fluid bearing as in claim 1 wherein there are two spaced points of inflection on the back surface and support member.

5. A fluid bearing as in claim 4 wherein the points of inflection on the back surface are defined by a pair of spaced protruberances, and the points of inflection on the support member are defined by a pair of spaced protruberances.

6. A fluid bearing as in claim 1 wherein the back surface of the face member and the support member have central points of inflection and the support member has a concavity.

* * * * *